US007244778B2

(12) United States Patent
Choate et al.

(10) Patent No.: US 7,244,778 B2
(45) Date of Patent: Jul. 17, 2007

(54) FILLER REINFORCED POLYETHER IMIDE RESIN COMPOSITION AND MOLDED ARTICLE THEREOF

(75) Inventors: Kim Choate, Tokyo (JP); Tatsuya Uchiyama, Moka (JP); Tsutomu Kinoshita, Moka (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/510,998

(22) PCT Filed: Apr. 11, 2003

(86) PCT No.: PCT/US03/11141

§ 371 (c)(1),
(2), (4) Date: Oct. 12, 2004

(87) PCT Pub. No.: WO03/087226

PCT Pub. Date: Oct. 23, 2003

(65) Prior Publication Data
US 2005/0131105 A1 Jun. 16, 2005

(30) Foreign Application Priority Data
Apr. 11, 2002 (JP) .............................. 2002-109570

(51) Int. Cl.
| C08K 3/10 | (2006.01) |
| C08K 3/22 | (2006.01) |
| C08K 3/34 | (2006.01) |
| C08K 3/40 | (2006.01) |
| C08K 9/04 | (2006.01) |
| C08K 5/04 | (2006.01) |

(52) U.S. Cl. .................. 524/395; 524/413; 524/445; 524/449; 524/451; 524/494

(58) Field of Classification Search ............... 524/395, 524/413, 445, 449, 451, 494
See application file for complete search history.

(56) References Cited

U.S. PATENT DOCUMENTS 5,571,875 A * 11/1996 Tsutsumi et al. ........... 525/425

5,856,403 A * 1/1999 Senga et al. .................. 525/64

FOREIGN PATENT DOCUMENTS

| EP | 0 104 659 | 4/1984 |
| EP | 0 418 719 | 3/1991 |

OTHER PUBLICATIONS

International Search Report for Application No. PCT/US03/11141 dated Jul. 23, 2003.
MatWeb—Online Material Data Sheet; Overview—Polyetherimide; Apr. 18, 2006; 4 pages; Available on line at http://www.matweb.com/specificmaterial.asp?bassnum=o3600&group=General.
MatWeb—Online Material Data Sheet; Overview—Polyimide; Apr. 18, 2006; 3 pages; Available on line at http://www.matweb.com/search/SpecificMaterial.asp?bassnum=O4200.

* cited by examiner

*Primary Examiner*—Kriellion Sanders
(74) *Attorney, Agent, or Firm*—Cantor Colburn LLP

(57) ABSTRACT

Problem To offer a suitable polyether imide resin composition for the plastic components for automobiles, domestic appliances or OA apparatus, equipment's for media where heat resistance, dimensional stability and fire retardancy is required. Means for solving the problem Filler reinforced polyether imide resin composition is characterized by containing (A) polyether imide resin, (B) thermoplastic resin, (C) fibrous reinforced filler and (D) Non-fibrous inorganic filler, wherein the amount of (A) polyether imide resin is 1 to 95% by weight, (B) thermoplastic resin: 1 to 95% by weight, (C) fibrous reinforced filler: 2 to 80% by weight, (D) Non-fibrous inorganic filler: 2 to 80% by weight, when total of (A) to (D) is 100% by weight. The filler reinforced polyether imide resin composition contains (A) polyether imide resin, (B) thermoplastic resin, (C) fibrous reinforced filler, (D) Non-fibrous inorganic filler and (E) alkali earth metal salts, wherein the amount of (A) polyether imide resin: 1 to 95% by weight, (B) thermoplastic resin: 1 to 95% by weight, (C) fibrous type reinforced filler: 2 to 80% by weight, (E) non-fibrous inorganic filler. 2 to 80% by weight, when total of (A) to (D) is 100% by weight, and (E) alkali earth metal salts are included in the amount of 0 to less than 5 parts by weight.

20 Claims, No Drawings

FILLER REINFORCED POLYETHER IMIDE RESIN COMPOSITION AND MOLDED ARTICLE THEREOF

SUMMARY OF THE INVENTION

Filler reinforced polyether imide resin composition contains (A) polyether imide resin, (B) thermoplastic resin, (C) fibrous reinforced filler and (D) Non-fibrous inorganic filler, and are included in the amount:
- (A) polyether imide resin: 1 to 95% by weight,
- (B) thermoplastic resin: 1 to 95% by weight,
- (C) fibrous reinforced filler: 2 to 80% by weight,
- (D) non-fibrous inorganic filler: 2 to 80% by weight, when total of (A) to (D) is 100% by weight.

In addition, filler reinforced polyether imide resin composition contains (A) polyether imide resin, (B) thermoplastic resin, (C) fibrous reinforced filler, (D) Non-fibrous inorganic filler and (E) alkali earth metal salts, and are included in the amount:
- (A) polyether imide resin: 1 to 95% by weight,
- (B) thermoplastic resin: 1 to 95% by weight,
- (C) fibrous type reinforced filler: 2 to 80% by weight,
- (D) non-fibrous inorganic filler: 2 to 80% by weight, when total of (A) to (D) is 100% by weight, and (E) alkali metal (earth) salts are included in the amount of 0 to less than 5 parts by weight.

The thermoplastic resin (B) is preferred to be at least one kind selected from polyphenylene ether, polyester, polycarbonate, polyester carbonate, polyamide, polyolefin, polyether, polysulfide, etc. The L/D ratio (Longitude/Diameter) of fibrous reinforced filler is preferred to be at least 100.

As fibrous reinforced filler (C), glass fibre, carbon fibre, titanium fibre, ceramic fibre are preferred. The fibrous reinforced filler (C) is preferred to be glass fibre coated with silane coupling agent, urethane resin, epoxy resin, etc. The non-fibrous inorganic filler (D) is preferred to be at least one kind selected from the group of scaly glass flakes, milled glass, mica, potassium titanate, porcelain clay, clay, talc, wollastonite and carbon block.

Alkali earth metal salts of perfluoro alkane sulfonic acid are preferred as alkali metal (earth) salt (E). The molded articles of the invention are characterized by comprising above-mentioned filler reinforced polyether imide rein composition. The above-mentioned molded articles are the plastic components for automobiles, electrical and electronic equipment, domestic appliances or OA apparatus and equipment used for media.

DETAILED DESCRIPTION OF THE INVENTION

Technical Field of the Invention

The invention relates to the molded article obtained from filler reinforced polyether imide resin composition and the present composition. Specifically, it relates to the molded article obtained from filler reinforced polyether imide resin composition and the present composition having excellent dimensional resistance at high temperature and low expansion coefficient.

Conventionally, as precision components with required heat resistance, although many metal things were used and were excellent in heat resistance, fire retardancy, and dimensional resistance but possesses problems, such as heavy weight, low mass production. Thus, in recent years, from the view point of light weight, mass production, filler reinforced polycarbonate, polyphenylene ether, polyphenylene sulfide, liquid crystal polymer, polyether imide resin are widely used in place of metal.

However, filler reinforced polycarbonate or polyphenylene ether etc. cannot produce plastic components for automobiles, electrical appliances, domestic appliances or OA apparatus, media apparatus that require deflection temperature under load at least 150° C. in conformity with ASTM method and satisfied physical properties, such as heat resistance.

Moreover, in spite of being able to carry out the fusion molding at comparatively low temperature of the polyphenylene sulfide resin that excels in the heat resistance, trimming was observed in the last molded object. In the trimming process, a possibility of chipping off a required portion as parts other than trim parts at the time of trimming process becomes high, and has lead to high defects. It has also open the way to many other problems, such as sulfur corrosion gas over the structure, shortening the life of the molded articles or time-consuming metallic mold maintenance that further affects the productivity. Moreover, although a crystalline liquid polymer has the outstanding heat resistance and was excellent in fusion molding at low temperature, it also had the problem of orientation of the resin above the resin structure depending on shearing during the molding and the final molding article was curved or had inadequate dimensional stability.

On the other hand, although polyether imide had outstanding high heat resistance, dimensional stability and chemical resistance, the mobility which was excellent when a resin fusion temperature was adjusted approximately 400° C. or high, cannot be obtained and also the moldability was not up to the mark.

Various tests were carried out to solve the problem. For example, polyether imide resin composition blended with 10 to 70% by weight inorganic filler (fibrous) and 0.5 to 20% by weight fluorocarbon resin has been mentioned in Kokai no. 60-38464. However, in this composition, if the orientation of fibrous filler was large, then the contraction difference in the flow direction and the perpendicular direction of resin would also be large, which is inadequate from the viewpoint of aeolotropy improvement, and the processing temperature of resin was not improved from a viewpoint of high processability.

OBJECTIVE OF THE INVENTION

The invention aims at offering fibrous filler or non-fibrous inorganic filler reinforced polyether imide resin composition used for plastic components for automobiles, electrical appliances, domestic appliances or OA apparatus, media apparatus that requires heat resistance, dimensional stability and fire retardancy.

Explicit Explanation of the Invention

Hereinafter, the detailed explanation of the invention. Each above-mentioned component used in the invention is explained one by one.

(A) Polyether Imide Resin

The component (A) polyether imide itself is a well-known component and contains repetitive units of the following formula (i).

Formula 1

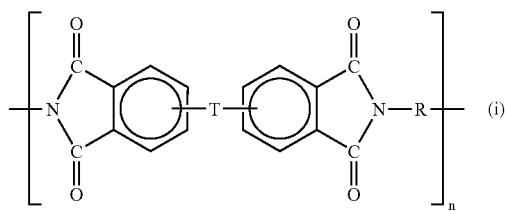

(Wherein, T is —O— or —O-Z-O, two bonds are positioned at 3,3', 3,4', 4,3' or 4,4'. Here Z is represented by the given formula.

Formula 2

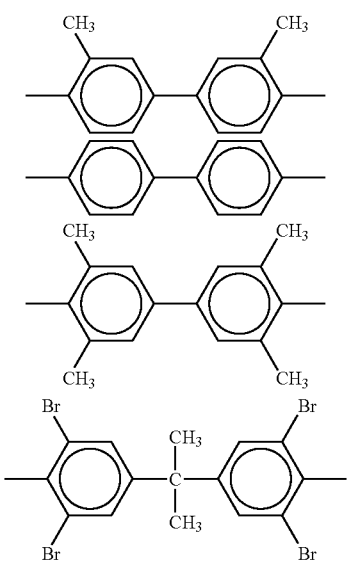

The group or formula (ii) represents Z.

Formula 3

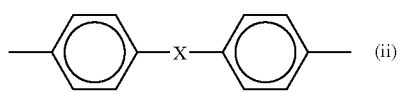

Z is bivalent organic group, X is bivalent group selected from the group of $-C_yH_{2y}-$, $-C(=O)-$, $-SO_2-$, $-O-$ and $-S-$ in the above mentioned formula (ii), here y is an integer from 1 to 5; R is (a) aromatic hydrocarbon group and its halogen derivative having 6 to 20 carbon atoms, (b) alkylene having 2 to 20 carbon atoms, cycloalkylene having 3 to 20 carbon atoms, and (c) is represented by the following formula (iii).

Formula 4

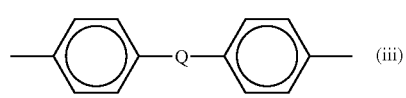

c is bivalent group, Q is bivalent group selected from the group of $-S-$, $-O-$, $-C(=O)-$, $-SO_2-$, $-C_xH_{2x}-$ and in the above mentioned formula (iii), here x is an integer from 1 to 5; n is the no. representing repetitive units. The preferred polyether imide includes polyimide repetitive units represented by the following formula (iv).

Formula 5

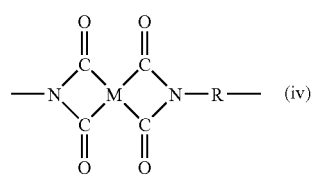

(Wherein, R is same as above, M is represented by the given formula.)

Formula 6

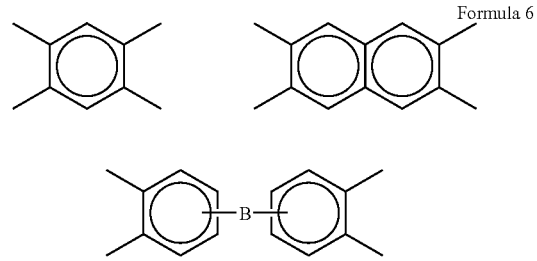

M is selected from the group, but B is —S— or —C(=O)—.)

The preferred polyether imide resin is represented by the general formula (v):

Formula 7

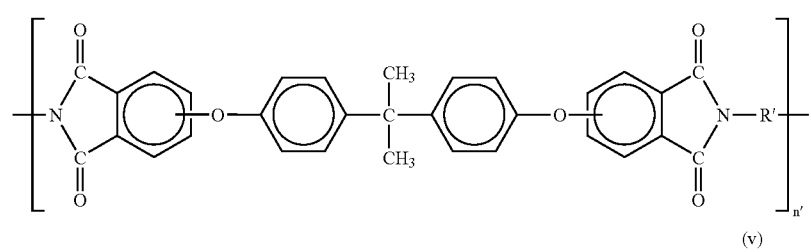

(Wherein, R' is aromatic hydrocarbon having 6 to 20 carbon atoms, n' is at least 2.).

The typical example is ULTEM (registered trademark) manufactured by General Electric Co. Ltd. The manufacturing method is mentioned in Kokai no. 57-9372. The polyether imide resin should provide polymerization degree having impact resistance.

(B) Thermoplastic Resin

The thermoplastic resin can be used without any restrictions.

The thermoplastic resin used in the invention is polyphenylene ether, polyester, polycarbonate, polyester carbonate, polyamide, polyolefin, polyether, polysulfide, etc. Amongst them all, thermoplastic resin used in the invention is at least 1 kind selected from polyphenylene ether, polyester, polycarbonate and polyester carbonate.

The well-known polyphenylene ether resin (PPE resin) can be used without any restrictions. PPE resin is represented by the general formula (I):

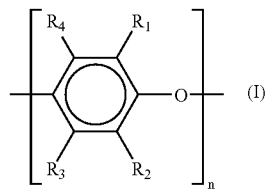

[Formula 8]

(Wherein, $R_1$, $R_2$, $R_3$ and $R_4$ independently represents hydrogen atom, halogen atom, hydrocarbon group, substituted hydrocarbon, alkoxy, cyano, phenoxy or nitro respectively, n represents the polymerization degree).

Polyphenylene ether resin used in the invention represented by above general formula can be independent polymer comprising one kind of structural unit or copolymer of at least two kinds.

The concrete examples of $R_1$, $R_2$, $R_3$ and $R_4$ are chlorine, bromine, iodine, methyl, ethyl, propyl, allyl, phenyl, benzyl, methylbenzyl, chloromethyl, bromomethyl, cyanoethyl, cyano, methoxy, ethoxy, phenoxy, nitro groups, etc.

The concrete examples of PPE resin are poly(2,6-dimethyl-1,4-phenylene)ether, poly(2,6-diethyl-1,4-phenylene) ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene) ether, poly(2,6-dimethoxy-1,4-phenylene)ether, poly(2,6-dichloromethyl-1,4-phenylene)ether, poly(2,6-dibromomethyl-1,4-phenylene)ether, poly(2,6-diphenyl-1,4-phenylene)ether, poly(2,6-ditolyl-1,4-phenylene)ether, poly(2,6-dichloro-1,4-phenylene)ether, poly(2,6-dibenzyl-1,4-phenylene)ether, poly(2,5-dimethyl-1,4-phenylene) ether, etc.

The preferred PPE resin is the polymer having $R_1$ and $R_2$ as alkyl group, specifically alkyl group having 1 to 4 carbon atoms, n at least 50, in the above formula (I). Thus, poly (2,6-dimethyl-1,4-phenylene) ether is preferably used. Moreover, when PPE resin is copolymer, 3 alkyl substituted phenol in the above mentioned polyphenylene ether unit e.g. copolymer having a part of 2,3,6-trimethylphenol, can be included. Further, in the PPE resin, copolymer having grafted styrene compound etc., can be used appropriately. As styrene compound, such as styrene, α-methylstyrene, vinyl toluene, chlorostyrene etc. are included. The preferred limiting viscosity of PPE is 0.10 to 0.50 (dl/g) in chloroform at 25° C.

Polyester resin used in the invention are, generally, aliphatic diol having 2 to 10 carbon atoms, alicyclic diols or their mixtures, or derived from at least one kind of aromatic dicarboxylic acid, aliphatic dicarboxylic acid, alicyclic dicarboxylic acid.

As diols, aliphatic diols, such as ethylene glycol, propylene glycol, 1,4-butanediol, neopentyl glycol, 1,5-pentanediglycol, 1,6-hexane diol having 2 to 10 carbon atoms; alicyclic diol, such as cyclohexanediol, cyclohexane dimethanol etc., are mentioned, and part of them has long chain of glycol having 400 to 6000 molecular weight. In other words, they can be substituted by polyethylene glycol, polytetramethylene glycol etc. or their mixtures.

The examples of aromatic dicarboxylic acid are terephthalic acid, isophthalic acid, phthalic acid, 2,6-naphthalene dicarboxylic acid, 1,5-naphthalene dicarboxylic acid (or ester derivative), 1,2-di(p-carboxyphenyl)ethane, 4,4-dicarboxy diphenyl ether and their mixtures.

As for all these acids, at least one kind is listed but the acid containing at least 80 molar % of terephthalic acid, is preferred. As alicyclic dicarboxylic acid, decahydronaphthalene dicarboxylic acid, norbornene dicarboxylic acid, bicyclooctane dicarboxylic acid, 1,4-cyclohexane dicarboxylic acid or their derivatives, but the most preferred is 1,4-cyclohexane dicarboxylic acid or its derivative. Long chained dicarboxylic acid, such as adipic acid, azelaic acid, dodecane dicarboxylic acid and succinic acid, can be used as aliphatic dicarboxylic acids.

The dicarboxylic acid can contain derivatives of alkyl ester (e.g. dialkyl ester, diaryl ester), anhydride, salt, acid chloride, acid bromide, etc.

The suitable polyester resin is the derivative of aliphatic diol and aromatic dicarboxylic acid.

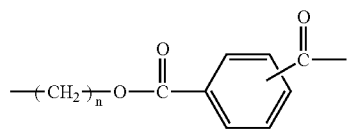

Formula 9

(Wherein n varies from 2 to 6).

Amongst the all, the most suitable polyester is polyethylene terephthalate, poly(1,4-butylene terephthalate) and their mixture.

In the invention, aliphatic acids and copolyester comprising little amount (e.g., 0.5 to 5% by weight) of unit derived from aliphatic polyol, can be used. As aliphatic polyol, glycol series, such as polyethylene glycol is listed. These polyesters are manufactured according to the method mentioned in U.S. Pat. Nos. 2,465,319 and 3,047,539.

The other suitable polyester, which can be used in the invention is obtained by reacting alicyclic polyester, such as isomer of 1,4-cyclohexane dimethanol (or their mixture) and the mixture of isophthalic acid and terephthalic acid. The polyester can be represented by the given formula:

Formula 10

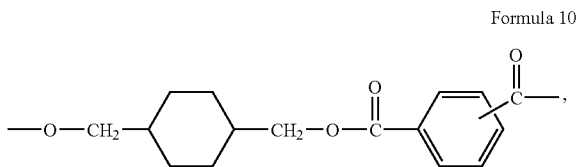

Furthermore, other suitable polyester is copolyester derived from cyclohexane dimethanol, alkylene glycol and aromatic dicarboxylic acid. The copolyester is obtained by the polycondensation of cis or trans isomer of 1,4-cyclohexane dimethanol (or their mixture) and alkylene glycol with aromatic dicarboxylic acid.

The result can be represented by the given formula.

Formula 11

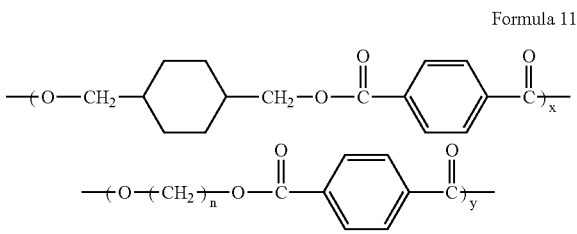

In the invention, a polymer in which at least one part of monomer contains a flexible segment unit like polyoxyethylene or polyoxybutylene can also be used. The examples of such polymer are polyethylene glycol, caprolactone, and the polymer prepared by mixing compound of dicarboxylic acid containing polyoxyalkylene segment during the polymerization reaction, and the obtained polymer possesses rubber elasticity. These kind of polyester are commercially available by the product name HYTREL and LOMOD manufactured by DuPont and General Electric Co. respectively.

Amongst the all polyester resin mentioned above, polybutylene terephthalate, polyethylene terephthalate, polycyclohexane dimethanol terephthalate and polyethylene naphthalate are appropriate in the invention.

Polyester resin that is used in the invention can be obtained commercially and can also be prepared by the well-known method mentioned in U.S. Pat. No. 2,901,466. Polyester used in the invention has intrinsic viscosity 0.4 to 2.0 dl/g when measured in the range 23 to 30° C. in the 60:40 mixture of phenol and tetrachloro ethane or some another similar solvent. The weight average molecular weight is 10000 to 150000, preferably 15000 to 100000.

Aromatic polycarbonate prepared by the well-known methods, such as phosgene method or fusion method (e.g., Kokai no. 63-215763 and 02-124934) can also be used as polycarbonate in the invention. Polycarbonate contains polycarbonate and phenol components. In order to introduce polycarbonate component, phosgene, diphenyl carbonate etc. are mentioned as precursor.

The examples of diphenol are 2,2-bis(4-hydroxyphenyl) propane (called as bisphenol A), 2,2-bis(3,5-dibromo-4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis (4-hydroxyphenyl)decane, 1,4-bis(4-hydroxyphenyl)propane, 1,1-bis(4-hydroxyphenyl)cyclododecane, 1,1-bis(3,5-dimethyl-4-hydroxyphenyl)cyclododecane, 4,4-dihydroxy diphenyl ether, 4,4-thiodiphenol, 4,4-dihydroxy-3,3-dichloro diphenylether and 4,4-dihydroxy-2,5-dihydroxy diphenylether. They can be used independently or in combinations. In addition, compounds containing at least 3 phenolic hydroxyl groups can be used.

Aromatic copolyester carbonate can also use as polycarbonate. It contains carbonate unit derived from aromatic diol and ester unit derived from aromatic diol and aliphatic dicarboxylic acid having 6 to 18 carbon atoms. The well-known phosgene method and fusion method for aromatic polycarbonate (refer U.S. Pat. Nos. 4,238,596, 4,238,597 and 3,169,121) can also be adopted to prepare it.

Amongst the amorphous thermoplastic resin, a compound having high glass transition temperature is preferred, such as polycarbonate, polyester carbonate, etc.

(C) Fibrous Reinforced Filler

The fibrous reinforced filler with L/D ratio at least 100, preferably at least 150. Furthermore, there are no specific restrictions, but generally, less than 5000, preferably less than 3000 is desirable.

The fibrous reinforced filler is at least one kind selected from glass fibre, carbon fibre, titanium fiber, and ceramic fibre. The fibrous reinforced filler can be used as a combination of at least two kinds. The most appropriate is glass fibre.

It is preferred to use chopped strand glass fibre processed by sizing agents from the viewpoint of workability. Moreover, in order to raise the adhesion of resin and reinforcing agent, it is desirable to process the surface of reinforcing agent with coupling agent, and may use a binder. The above-mentioned compound can be used as coupling agent. The finishing agent, such as silane coupling agent, titanate-coupling agent etc. can be used for processing. Epoxysilane, aminosilane, vinylsilane etc. are listed as silane coupling agent, and monoalkoxy, chelate, coordinate etc. are mentioned as titanate coupling agent.

When using a glass fiber as the above-mentioned reinforced filler, it is desirable to have a diameter of 1 to 20 μm and length about 0.01 to 50 mm. If fiber length is too short, the strengthening effect is not enough, and adversely if it is too long, it will affect the surface, extrusion processability and molding processability of the molded article, which is not desirable.

As glass fibre, both long fibre type and short fibre type can be used. Specifically, E glass, C glass, A glass, S glass, M glass are mentioned, but E glass is suitable from the viewpoint of durability, insulation and cost.

(D) Non-fibrous Inorganic Filler

The filler other than above-mentioned fibrous inorganic filler is used as non-fibrous inorganic filler (D).

The non-fibrous inorganic filler are at least one kind selected from the group of scaly glass flakes, milled glass, mica, potassium titanate, porcelain clay, clay, talc, wollastonite, carbon block, etc.

As scaly glass flakes, flakes of maximum diameter (L) less than 1000 μm, and (L/D) ratio at least 5 is preferred. The glass flakes used in the invention are scaly glass flakes, the maximum diameter of the resin composition is less than 1000 μm, preferably in the range 1 to 500 μm, and aspect ratio (ratio of diameter and thickness) at least 5, preferably 10, and most preferred is at least 30.

Although commercially available glass flakes can be used as it is, and in case if it is blended with the resin, it can be used after grinding. If the maximum diameter of above-mentioned glass flakes exceeds 1000 μm, it results to the classification during blending and the uniform mixture with resin may become difficult, and may affect the physical properties of a molded article. On the other hand, if aspect ratio is less than 5, the improvement in heat distortion temperature of the molded article is inadequate, and also has the tendency of low Izode impact strength.

Moreover, the scaly fillers having equal aspect ratio as the above-mentioned glass flakes among the fillers comprising mineral, such as talc, mica, wollastonite etc., are the most suitable fillers.

Moreover, in case of short fiber, such as potassium titanate, milled glass, L/D ratio should be less than 100, preferably less than 80.

In addition, fillers other than above mentioned fillers with average particle size 0.1 to 1000 μm, preferably 1 to 600 μm are preferred. The non-fibrous inorganic filler used in the invention does not need surface treatment even if it is required.

According to the invention, the increase in linear expansion coefficient is controlled when fibrous filler and non-fibrous filler are used simultaneously as compared to blended fibrous filler. As a result, resin composition with outstanding dimensional stability can be fabricated.

(E) Alkali Earth Metal Salts

The alkali metal (earth) salts are being used in the invention. The alkali metals (earth) used to prepare alkali metal (earth) salts are sodium, potassium, lithium, cesium, rubidium, beryllium, magnesium, calcium, strontium and barium. Amongst the all, sodium and potassium are preferred, specifically potassium.

As alkali earth metal salts, aromatic alkali sulfonate mentioned in Kokai no. 50-98546, aromatic sulfone and alkali metal (earth) sulfonate (aromatic sulfone: -Ph-$SO_2$-Ph-:Ph is phenyl) mentioned in Kokai no. 50-98549, alkali sulfonate of aromatic ketone (sulfonic acid radical replaced with hydrogen of aromatic ring) mentioned in Kokai no. 50-98547, heterocyclic alkali sulfonate mentioned in Kokai no. 50-116542, halogenated non-aromatic alkali carbonates mentioned in Kokai no. 50-97642, alkali sulfonate of aromatic sulfide mentioned in Kokai no. 50-98539, aromatic ester alkali sulfonate mentioned in Kokai no. 50-98543, aliphatic or olefin series of alkali sulfonate mentioned in Kokai no. 50-98542, phenol ester alkali sulfonate mentioned in Kokai no. 50-98544, alkali salts of halogenated oxocarbon acid mentioned in Kokai no. 50-98538, halogen substituted aromatic alkali sulfonate mentioned in Kokai no. 50-98545, can also be used. The alkali earth metal salt can be monomer or it may be contained in a part of unit that constitutes a polymer. The alkali earth metal salt can be used in combination also.

The concrete examples of alkali earth metal salts mentioned in Kokai no. 50-98544 are sodium[phenyl-2,4,5-trichlorobenzenesulfonate]-4'-sulfonate, calcium[4-bromophenyl-2,4,5-trichlorobenzenesulfonate]-3'-sulfonate, sodium[4,4'-dichlorodiphenylcarbonate]-2-sulfonate potassium[tris(2-chlorophenyl) phosphate]-4-sulfonate, barium[bis(4-bromophenyl) sulfate]-3-sulfonate, sodium[bis-2,4,5-trichlorophenylterephthalate]sulfonate, disodium[diphenyloxalate]-4,4'-disulfonate, sodium[phenylpentachlorobenzenephosphonate]-4'-sulfonate, disodium[diphenyldibromomaleate]-4,4'-disulfonate, disodium[bisphenol-A-bis(2,4,5-trichlorobenzene)sulfonate]-2,2'-disulfonate, polysodium[bisphenol-A-polycarbonate]polysulfonate, polysodium[(bisphenol-A-)-(tetrabromobisphenol-A)copolycarbonate]polysulfonate, sodium[pentachlorophenylbenzoate]-3-sulfonate, sodium[bis(p-chlorophenyl) isophthalate]-5-sulfonate, sodium salt of hydroquinone[thiobenzoate][2',4',5'-trichlorobenzene-sulfonate]-2-sulphonic acid, potassium(pentachlorophenyl) phenylmethyl-phosphonate-4-sulfonate, sodium-2-chlorophenylbenzenesulfinate-4-sulfonate, disodiumbis(4-chlorophenyl)succinate-2,2'-sulfonate and sodium salt of bis(2-chlorophenoxy)methylphenylsilane-4,4'-disulfonic acid. In addition, alkali earth metal salts of triphenyltrimellitate disulfonic acid, 4-chlorophenylthiobenzoate sulphonic acid, 4,4'-dichloro diphenylsulphite disulfonic acid, 4,5-dibromophenylbenzenesulfonate sulfonic acid, diphenylsulfate sulfonic acid, tri(α-naphthyl)phosphate trisulfonic acid, hydroquinone bis(phenyl phenylphosphate) sulfonic acid, tetrabromo bisphenol-A-bis(4-chlorophenylsulfate) disulfonic acid, diphenyl dibromomaleate disulfonic acid bisphenol-A-bis[bis(4-chlorophenyl)thiophosphate] disulfonic acid, poly(diphenylsiloxane)polysulfonic acid, poly(bisphenol-A-tetrachlorobisphenol-A)-polysulfonic acid, bisphenol-A-bis(2,4,5-trichlorobenzenesulfonate) sulfonic acid, are also listed.

Furthermore, disodium-thiophene-2,5-disulfonate, calcium-thiophene-2-sulfonate, sodium-benzothiophene-sulfonate, sodium-4-bromothiopene-2-sulfonate, sodium-5-bromothiopene, sodium-4,5-dibromothiopene-2-sulfonate, sodium-2,6-dibromopyridine-3-sulfonate, disodium-indico-5,5'-disulfonate, tetrasodium-copper-phthaocyanine tetrasulfonate, 2,4,5,7-tetrachlorobenzothiopene-3,6-disulfonate, disodium-2,7-dichlorodibenzofuran-1,8-disulfonate, calcium-2-(trifluoromethyl)pyridine-5-sulfonate, calcium-4,5-dibromothiopene-2-sulfonate, calcium-2,5-dibromothiopene-3-sulfonate, sodium-2,4,5-tribromothiopene-3-sulfonate, sodium-2,5-dibromothiopene-3-sulfonate, sodium-pyridine-3-sulfonate, calcium-pyridine-3-sulfonate, sodium-4-cyanopyridine-2-sulfonate, sodium-2,5-dichloro-3-nitrothiopene-4-sulfonate, sodium-2,5-dichlorothiopene-3-sulfonate, disodium salts of trifluorothiopene sulfonic acid, disodium slats of thianapthalene indene indico sulfonic acid, dicalcium slats of pyridine-3,5-disulfonic acid, disodium slats of tetrachlorobenzopyrrole disulfonic acid, lithium salts of trichloroquinoline-8-sulfonic acid, tetrasodium salts of octachloro copperphthaocyanine tetrasulfonic acid, barium salts of tetrachloro thiadurene disulfonic acid, sodium salts of dichlorobenzothiazole sulfonic acid, calcium salts of 3,4,5-trichlorothiopene-2-sulfonic acid, disodium salts of 3,4-dichlorothiopene-2,5-disulfonic acid etc., mentioned in Kokai no. 50-116542 can also be used.

In addition, sodium-2,4,6-trifluoroacetophenone-4-sulfonate, disodium-benzophenone-3,3'-disulfonate, sodium-4,4'-dichlorobenzophenone-3,3'-disulfonate, calcium-4,4'-dichlorobenzophenone-3-sulfonate, sodium-3,3',4,4'-tetrachlorobenzyl-5-sulfonate, calcium-2,3-dichloronaphthoquinone-χ-sulfonate, barium-4,4'-dichlorobenzophenone-3-sulfonate, sodium-1,5-dichloroanthraquinone-disulfonate, sodium-2,5-dichloroanthraquinone-disulfonate, sodium-4-(trifluoromethyl)-4'-nitrobenzophenone sulfonate, sodium-4-cyanobenzophenone-4'-sulfonate, mentioned in Kokai no. 50-98547 can also be used.

Furthermore, sodium salt of diphenylsulfone-3-sulfonic acid, sodium salt of 4,4'-dibromo diphenyl-sulfone-3-sulfonic acid, calcium salt of 4-chloro-4'-nitrodiphenylsulfone-3-sulfonic acid, calcium salt of 4-chloro-3'-(trifluoromethyl) diphenylsulfone-3-sulfonic acid, disodium salt of diphenylsulfone-3,3'-disulfonic acid, disodium salt of 4,4'-dichlorodiphenylsulfone-3,3'-sulfonic acid, disodium salt of 4,2',4',5'-tetrachlorodiphenylsulfone-3,5-disulfonic acid and calcium salt of 4,4'-dichloro-1,1'-dinapthylsulfone-5,5'-sulfonic acid, mentioned in Kokai no. 50-98549 can also be used.

Formula 12

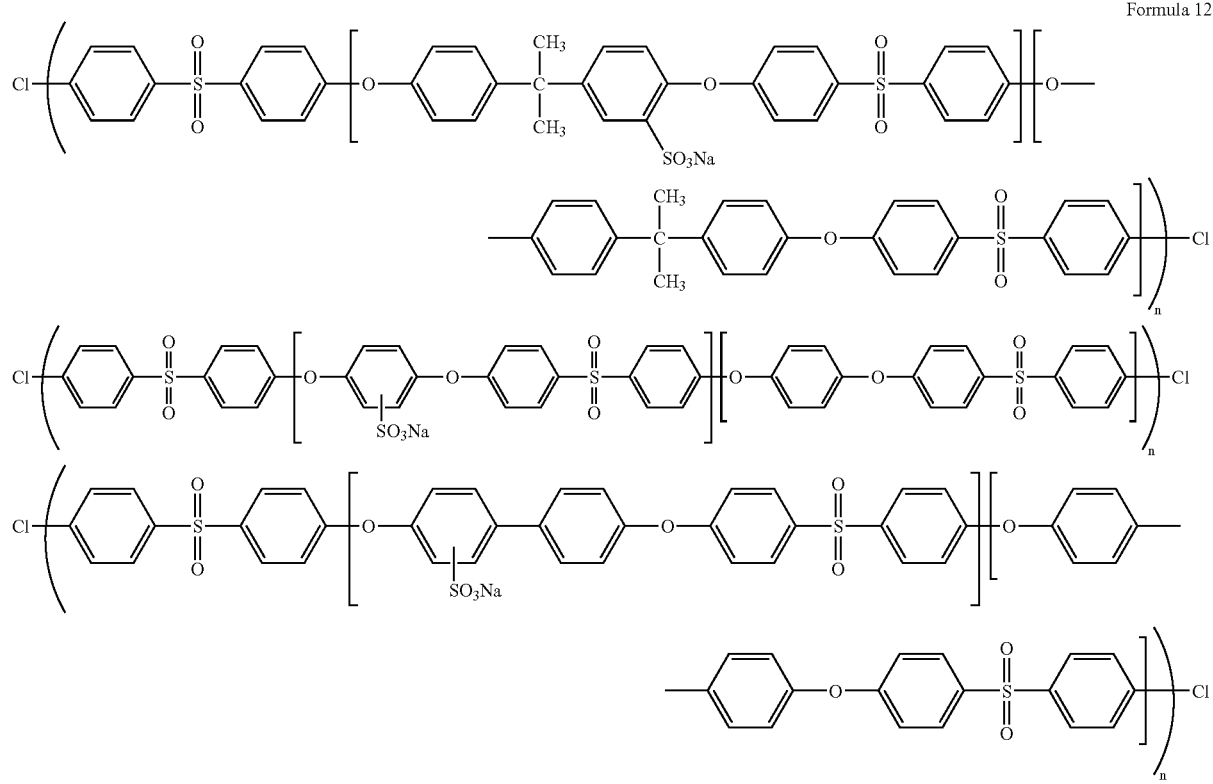

Moreover, disodium squaric acid, barium resin acid, disodium chloranilic acid, calcium chloranilic acid, disodium croconic acid, disodium chloranilic acid, barium chloranilic acid etc. mentioned in Kokai no. 50-98538 can also be used.

Furthermore, sodium-2,5-difluorobenzene sulfonate, sodium-3,4-dichlorobenzene sulfonate, sodium-2,4,5-tribromobenzene sulfonate, sodium-2,4,5-trichlorobenzene sulfonate, sodium-p-iodobenzene sulfonate, sodium-2,4-dibromo-5-fluorobenzene sulfonate, calcium-2,5-dichlorobenzene sulfonate, sodium-2,5-dichlorobenzene-1,3-disulfonate, sodium-4,4'-dibromophenyl-3-sulfonate, disodium-2,5-dichlorobenzene-1,1-bis(4'-chlorophenyl)ethylene-3,3'-disulfonate, sodium-2,4-dinitrobenzene sulfonate, calcium-2-chloro-5-nitrobenzene sulfonate, calcium-3-(trifluoromethyl)benzene sulfonate, calcium-2-chloro-5-nitrobenzene sulfonate, mentioned in Kokai no. 50-98545 can also be used.

Disodium-diphenylsulfide-4,4'-disulfonate, sodium-4,4'-dichlorodiphenylsulfide-3-sulfonate, disodium-4,4'-dichloro-1,1'-dinapthylsulfide-5,5'-disulfonate, sodium-2-nitrothiadurene-5-sulfonate, sodium-2,3,5,6-tetrachloro-4-cyanodiphenylsulfide-4-sulfonate, sodium-1,2,4,5-tetrachloro-3-[p-(trifluoromethyl)phenylthio]-6-(phenylthio)-benzene-4'-sulfonate, mentioned in Kokai no. 50-98539 can also be used.

Sodium-2,3,4,5,6-pentachloro-β-styrene sulfonate, sodium-trichlorovinyl sulfonate, calcium-2,3,4,5,6-pentabromo-β-styrene sulfonate, sodium-pentachloro-1,3-butadiene-1-sulfonate, barium-2-chloro-3,3,4,4,5,5-hexafluorocyclopentane-1-sulfonate, sodium-2,4-dichlorotoluene-α-sulfonate, disodium-2,4,5,6-tetrachloro-m-xylene-α,α'-disulfonate, calcium-pentabromotoluene-α-sulfonate, sodium-heptafluoro cyclobutane sulfonate, sodium-1,2,2,2-tetrachloroethane sulfonate, sodium-2,3,4,5,6-pentachloro-β-styrene sulfonate, sodium-trichlorovinyl sulfonate etc., mentioned in Kokai no. 50-98542 can also be used.

Moreover, disodium chlorendate, dilithium chlorendate, dicalcium chlorendate, strontium chlorendate, sodium trichloro acetate, sodium 3,4-dichloro cinnamate, disodium hexafluoro glutalate, disodium dibromo maleate, disodium-5,6,7,8,9,9-hexachloro-1,2,3,4,4a,5,8,8a-octahydro-5,8-endo-methylene-2,3-dicaboxylate, disodium-5,6,7,8,9,9-hexachloro-1,2,3,4,4a,5,8,8a-octahydro-1,4-5,8-di-endo-methylene-2,3-dicarboxylate, calcium-2,3,4,5,6-pentachloro sodium shinmate, calcium dichlorofluoro acetate, calcium-1,4,5,6,7,7-hexachloronorbornene-2-carboxylate, mentioned in Kokai no. 50-97642 can also be used.

Furthermore, sodium benzenesulfonate, strontium benzenesulfonate, magnesium benzenesulfonate, dipotassium-o-benzenesulfonate, disodium-naphthalene-2,6-disulfonate, potassium-biphenyl-3,3'-disulfonate, disodium-1,1,1-trichloro-2,2-diphenyl ethane-4,4'-disulfonate, disodium-dibenzyl-4,4-disulfonate, disodium-triphenylmethane-4,4'-disulfonate, potassium-trans-α,α'-dichloro styrene-4,4'-disulfonate, sodium-o-toluene sulfonate etc. can also be used.

In addition, disodium tetrachloro diphenyl ether disulfonate, disodium-4-bromo diphenyl ether-2,4-disulfonate, calcium-1-methoxynaphthalene-4-sulfonate, sodium-2,6-dichloroanisole-4-sulfonate, sodium-4-dodecyldiphenyl ether disulfonate, sodium-1,5-dichloro dibenzo-p-dioxine sulfonate, polysodium poly(2,6-dimethyl phenylene oxide) polysulfonate, polysodium poly(2-methyl-6-phenyl phenylene oxide) polysulfonate, polysodium polychloro polyphenylene oxide polysulfonate, disodium tetrachloro diphenyl ether disulfonate etc., mentioned in Kokai no. 50-98543 can also be used.

Furthermore, as alkali earth metal, alkali earth metal salts of perfluoro alkane sulfonic acid can be used. As metal salts of perfluoro alkane sulfonic acid, sulfonic acid having perfluoro alkane with preferably 1 to 19 carbon atoms, more preferably 4 to 8 carbon atoms, are used.

The most preferred alkali earth metal salts of perfluoro alkane sulfonic acid are sodium salt of per fluoro butane sulfonic acid, calcium salt of per fluoro butane sulfonic acid, sodium salt of perfluoromethylbutane sulfonic acid, calcium salt of perfluoromethylbutane sulfonic acid, sodium salt of per fluoro octane sulfonic acid, calcium salts of per fluoro octane sulfonic acid, etc.

In addition, metal salts of sulfonamide or sulfimide, such as sodium salt of saccharine, calcium salt of saccharine, calcium salt of N-(p-tolylsulfonyl)-p-toluene sulfimide, can also be used.

The alkali earth metal salts used in the invention are fire retardant alkali earth metal salt of perfluoro alkane sulfonic acid, preferably calcium salt of per fluoro alkane sulfonic acid, specifically potassium-per fluoro butane sulfonic acid.

The fire retardancy of the composition can be improved if the composition contains alkali earth metal salts.

Components of Resin Composition

The filler reinforced polyether imide resin composition contains above mentioned polyether imide resin (A), thermoplastic resin (B), fibrous reinforced filler (C) and non-fibrous inorganic filler (D).

The composition is characterized by containing the following components by the amount:

(A) polyether imide resin: 1 to 95% by weight,
(B) thermoplastic resin: 1 to 95% by weight,
(C) fibrous reinforced filler: 2 to 80% by weight,
(D) non-fibrous inorganic filler: 2 to 80% by weight, when total of (A) to (D) is 100% by weight.

Preferably,
(A) polyether imide resin: 5 to 75% by weight,
(B) thermoplastic resin: 5 to 75% by weight,
(C) fibrous reinforced filler: 10 to 50% by weight,
(D) non-fibrous inorganic filler: 10 to 50% by weight, when total of (A) to (D) is 100% by weight.

The weight ratio (A:B) is 1:99 to 99:1, preferably 10:90 to 90:10.

Furthermore, the weight ratio (C:D) is 1:99 to 99:1, preferably 10:90 to 90:10.

If the weight ratio is in the above-preferred range, the balance of fire retardancy, fluidity and contraction is excellent.

The desired weight ratio (A+B):(C+D) of total weight of (C) and (D) corresponding to total weight of (A) and (B) is 20:80 to 99:1, preferably 50:50 to 90:10. If the weight ratio is in the above-mentioned range, the physical properties of the resin are not deteriorated, and along with the compound formation, molding is also possible.

Moreover, the filler reinforced polyether imide resin composition containing alkali earth metal salt (E):

(A) polyether imide resin: 1 to 95% by weight,
(B) thermoplastic resin: 1 to 95% by weight,
(C) fibrous reinforced filler: 2 to 80% by weight,
(D) non-fibrous inorganic filler: 2 to 80% by weight, when total of (A) to (D) is 100% by weight, and (E) alkali earth metal salts are included in the amount of 0 to less than 5 parts by weight.

Preferably,
(A) polyether imide resin: 5 to 70% by weight,
(B) amorphous thermoplastic resin: 5 to 70% by weight,
(C) fibrous reinforced filler: 10 to 50% by weight,
(D) non-fibrous inorganic filler: 10 to 50% by weight, when total of (A) to (D) is 100% by weight, and (E) alkali earth metal salts are included in the amount of 0.01 to 1 parts by weight.

The weight ratio (A:B) is 1:99 to 99:1, preferably 10:90 to 90:10.

Furthermore, the weight ratio (C:D) is 1:99 to 99: 1, preferably 10:90 to 90:10.

If the weight ratio were in the above-preferred range, the aeolotropy of only fibrous reinforced filler resin composition would be improved.

The desired weight ratio (A+B):(C+D) of total weight of (C) and (D) corresponding to total weight of (A) and (B) is 20:80 to 99:1, preferably 50:50 to 90:10. If the weight ratio is in the above-mentioned range, the physical properties of the resin are not deteriorated, and along with the compound formation, molding is also possible.

The ratio of (E) to total weight of (A) and (B) is 0.01 to 1% by weight, preferably 0.03 to 0.5% by weight. If the weight ratio is in the above-mentioned range, the mechanical strength of the resin composition is not affected and fire retardancy can be improved.

There is no specific restriction on the method of preparation of resin composition, and any known method can be adopted. For example, blending the above mentioned additives with molten resin. The mixing and kneading can be done by extruder, banbury mixer, roller, and kneader. The dispersed mixing of the additives in the powdered or pellet resins can be done by various apparatus, such as turnball mixer, henschel mixer, ribbon blender, super mixer etc., and melting and kneading can by done by extruder, banbury mixer, roller, kneader etc. after dispersed mixing.

The blending of these additives can be done batch-wise or continuously. Furthermore, the mixing order of the components was not fixed.

The following additives can be blended with the resin composition as long as they do not affect the objective of this invention:, heat resistant, antistatic agent, slipping agent, anti-break oil, lubricants, defogging agent, plasticizer, fire retardant, fluidity improving gent, natural oil, synthetic oil, wax, organic filler, etc.

The resin composition has low linear expansion coefficient, dimensional stability, and high mechanical strength at high temperature, and is suitable in the required field of heat resistance and dimensional stability. In addition, resin composition having alkali earth metal salts excels in fire retardancy.

The resin composition is ideal for automobile exterior decor, such as door mirror, louver, visor, emblem, outside sheet etc.; automobile interior decor, such as pillar, bead rest etc.; automobile electrical components, such as switch, connector, heater, sensor, throttle; electrical components, such as sensor, heater, relay, switch, connector, antenna etc., housing cover case, such as machine cover, light cover (external and internal), machine cover, washing machine, mobile phone, data storage case, disc tape etc; flat plate and corrugated plate, carport exterior, discharged mass, signboard and display, erect sound insulation walls, nameplate, display partition board, window frame and window sash, tube, auto glazing line board, traffic signal, refrigerator, machine tool, fixing tool, equipments for outdoor sports, fishing gear, outdoor box, cable guide, play equipment (slide and jogging board) etc., toys, game machine, television, personal computer, printer, LBP, photocopy machine, facsimile, hair dryer, fire extinguisher case, radio-cassette recorder, electricity jar pot, CD or DVD reader, writer etc., chassis, pick up chassis, lens holder etc., semiconductor components for IC tray, IC socket, wafer carrier etc., display components, such as LED, LCD, PDP, DY etc., yarn, sealant, LED, garbage recycling machine for household, resin modifier, internal and external air conditioner, IC card, ATM, battery, etc. Moreover, it is possible to use in daily necessities where fire retardancy is required, electric wire covering, etc.

RESULT OF THE INVENTION

The filler reinforced polyether imide resin composition demonstrates the heat resistance and high dimensional resistance of polyether imide resin, and since fusion molding can be carried out even at low temperature of 20° C. to 70° C. from the conventional temperature of about 400° C., it excels in moldability. Moreover, trimming is not observed during molding.

Furthermore, since it is reinforced with fibrous and non-fibrous filler, it demonstrates the low linear expansion coefficient, dimensional stability and high mechanical strength at high temperature same as conventional polyether imide resin or more than it. Therefore, it is suitable as plastic components for automobiles, domestic appliances or OA apparatus, equipments for media where heat resistance, dimensional stability and fire retardancy are required.

EMBODIMENT

Hereinafter, embodiments are explained briefly, and the invention is not restricted to these.

Further, following components were used in the embodiments.
(1) Polyether imide resin (component (A)): ULTEM1010 (brand name) manufactured by GE Plastics was used.
(2) Polyester carbonate (component (B)): LEXAN RL6829 (brand name) manufactured by GE Plastics was used. Hereinafter, abbreviated as PCE.
(3) Glass Fibre (component (C)): Glass Chopped Strand ECS03T-785G (brand name) manufactured by Nippon Electric Glass Co., Ltd. Hereinafter, abbreviated as GF. Average fiber length: 3 mm, average particle size: 9.5 micron, average aspect ratio: 306
(4) Glass Flake (component (D-1)): REFG301B (product of Nippon Electric Glass Co., Ltd., average particle size 140 μm, average aspect ratio 28) was used. Hereinafter, abbreviated as G Flake.
As component (D-2), M glass (PFB001 by Toyobo Co., Ltd.) is used.
(5) Alkali earth metal salt (component (E)): Calcium-perfluoro butane sulfonate ($C_4F_9SO_3K$, Bayowet by Bayer).
(6) Polyphenyl sulfone: In comparative example used in place of polyether imide.

Embodiment 1 to 8 and Comparative Example 1 to 4

The pellets (size approx. 3 mm) were prepared by melting and kneading the above mentioned raw material in the ratio shown in table 1 by using biaxial extruder, kneading preset temperature 350° C. and screw rotation 100 rpm. The test sample was prepared by using injection molding machine of Toyo Machinery & Metal Co., Ltd. under the conditions of preset temperature 350° C. and tool temperature 120° C.

The following evaluations were conducted for the obtained test sample. The results are shown in table 1.
Characteristics Evaluation Method
  Physical Properties Test
(1) Deflection temperature under load: Test sample of thickness (¼) inch under load of 18.6 kg/cm² was measured in accordance with ASTMD 648.
(2) Flexural modulus: Test sample of thickness (¼) inch was measured in accordance with ASTMD 790.
(3) Linear Expansion coefficient: A sample was cut in the flow direction and the right angle direction of the resin from the tensile sample of ASTM-1, and was measured in the flow direction and perpendicular direction with respect to flow direction by TMA method at the temperature range of −30° C. to 120° C.
(4) Melt flow index (MFI): Was measured in accordance with ASTMD 1238 at 337° C., load 6.7 kg/cm².
(5) Fire retardancy test: According to the test method UL94V, the fire test was conducted on test sample of thickness 0.8 mm, and the ability confirmation of UL94V was performed.
(6) Trimming test after molding: The rib plate manufactured by GE Plastics was used, and 10 pieces were drawn out of the molded article after 20 shots of continuous molding. The trimming was visually checked in the parts of the 10 pieces. The standard evaluation was as follows:
◎: Trimming was not at all observed visually.
○: Trimming was observed in two pieces visually.
Δ: Trimming was observed in 2 to 5 pieces visually.
X: Trimming was observed in all the pieces visually.

TABLE 1

| | | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|
| Mixture Composition | (A) Ultem 1010 | 40 | 30 | 40 | 10 | 26 | 40 | 20 | 40 |
| | (B) PCE | 10 | 30 | 10 | 40 | 24.92 | 19.94 | 30 | 19.92 |
| | (C) GF | 20 | 30 | 30 | 40 | 40 | 30 | 40 | 30 |
| | (D-1) G Fluke | 30 | 20 | 10 | 10 | 10 | 10 | | |
| | (D-2) M Glass | | | | | | | 10 | 20 |
| | (E) Rimer salt | | | | | 0.08 | 0.06 | | 0.08 |
| | (F) PPS | | | | | | | | |

TABLE 1-continued

| Physical properties test | Deflection temperature under load (° C.) | 205 | 195 | 205 | 170 | 180 | 200 | 170 | 205 |
|---|---|---|---|---|---|---|---|---|---|
| | Flexural Modulus (kg/cm$^2$) | 130000 | 95000 | 120000 | 115000 | 120000 | 110000 | 110000 | 110000 |
| | linear expansion coefficient (flow direction)-30~120° C. (×10$^{-5}$) | 2 | 1.8 | 2 | 1.8 | 1.5 | 2 | 1.8 | 1.5 |
| | linear expansion coefficient (vertical direction)-30~120° C. (×10$^{-5}$) | 2.5 | 3 | 4 | 4 | 4 | 4 | 4.5 | 4 |
| | Melt Flow Index (g/10 min) | 7 | 12 | 7 | 20 | 14 | 10 | 15 | 10 |
| | Fire retardancy (UL94 V thickness 0.8 mm) | V 1 equivalent | HB equivalent | V 1 equivalent | HB equivalent | V 0 equivalent | V 0 equivalent | HB equivalent | V 0 equivalent |
| | Trimming in molded article | ⊙ | ⊙ | ⊙ | ⊙ | ⊙ | ⊙ | ⊙ | ⊙ |

| | | | Comparative Example 1 | Comparative Example 2 | Comparative Example 3 | Comparative Example 4 |
|---|---|---|---|---|---|---|
| Mixture Composition | (A) Ultem 1010 | | 15 | 30 | 70 | |
| | (B) PCE | | 85 | 40 | | |
| | (C) GF | | | 30 | 30 | 65 |
| | (D-1) G Fluke | | | | | |
| | (D-2) M Glass | | | | | |
| | (E) Rimer salt | | | | | |
| | (F) PPS | | | | | 36 |
| Physical properties test | Deflection temperature under load (° C.) | | 160 | 190 | 210 | 260 |
| | Flexural Modulus (kg/cm$^2$) | | 27000 | 90000 | 92000 | 200000 |
| | linear expansion coefficient (flow direction)-30~120° C. (×10$^{-5}$) | | 5 | 2.5 | 2 | 2 |
| | linear expansion coefficient (vertical direction)-30~120° C. (×10$^{-5}$) | | 7 | 6.5 | 5 | 5 |
| | Melt Flow Index (g/10 min) | | 25 | 15 | 3 | 30 |
| | Fire retardancy (UL94 V thickness 0.8 mm) | | HB equivalent | HB equivalent | V 0 equivalent | V 0 equivalent |
| | Trimming in molded article | | ⊙ | ⊙ | ⊙ | X |

The composition obtained in the embodiments 1 to 8 has well-maintained balance between the physical properties, such as linear expansion coefficient, dimensional stability, high mechanical strength and fluidity at high temperature.

On the other hand, when filler is not used together like comparative example 1, linear expansion coefficient is high, and for this reason, the dimensional stability becomes inadequate. Furthermore, if resin other than polyether imide resin is included and is reinforced by fibrous filler like comparative example 2, the vertical expansion coefficient is higher than the flow direction, which is a problem from the viewpoint of aeolotropy. Moreover, if polyether amide resin is reinforced by fibrous filler like embodiment 3, linear expansion coefficient is comparatively low and shows high mechanical strength, but because of low fluidity, it is a problem from the viewpoint of moldability. And although comparative example 4 shows well maintained balance between the physical properties, trimming is observed in the molded article and a problem is seen in the final production.

The invention claimed is:

1. A filler reinforced polyether imide resin composition comprising:
   a. a polymer composition consisting of a polyether imide resin in the amount of 1 to 95% by weight, and
   b. at least a thermoplastic resin selected from the group consisting of polyphenylene ether, polyester, polycarbonate, polyester carbonate, polyamide, polyolefin, and polyether in the amount of 1 to 95% by weight;
   c. a fibrous type reinforced filler in the amount of 2 to 80% by weight; and
   d. a non-fibrous inorganic filler in the amount of 2 to 80% by weight, wherein the weight percents are based on the total weight of the composition, and wherein said composition has a heat deflection temperature greater than or equal to about 170° C. as determined by ASTM D648 and a linear expansion coefficient in the vertical direction of less than $5 \times 10^{-5} K^{-1}$ over the temperature range from 30° C. to 160° C. as determined by means of a TMA.

2. The filler reinforced polyether imide resin composition of claim 1, wherein the fibrous reinforced filler has a L/D ratio (longitudinal length/diameter) of at least 100.

3. The filler reinforced polyether imide resin composition of claim 1, further comprising less than 5% by weight of an alkali earth metal salt.

4. The filler reinforced polyether imide resin composition of claim 3, wherein the alkali earth metal salt is a salt of perfluoro alkane sulfonic acid.

5. The filler reinforced polyether imide resin composition of claim 3, wherein the alkali earth metal salt is selected from the group consisting of sodium salt of perfluoro butane sulfonic acid, sodium salt of perfluoromethylbutane sulfonic acid, sodium salt of perfluoro octane sulfonic acid, calcium salt of perfluoro alkane sulfonic acid and the salt of the potassium perfluoro butane sulfonic acid.

6. The filler reinforced polyether imide resin composition of claim 1, wherein the fibrous reinforced filler is selected from the group consisting of glass fiber, carbon fiber, titanium fiber and ceramic fiber.

7. The filler reinforced polyether imide resin composition of claim 1, wherein the fibrous reinforced filler is coated with a silane coupling agent, urethane resin, or epoxy resin.

8. The filler reinforced polyether imide resin composition of claim 1, wherein non-fibrous inorganic filler is selected from the group consisting of scaly glass flakes, milled glass, mica, potassium titanate, porcelain clay, clay, talc, wollastonite, carbon black, and combinations thereof.

9. The filler reinforced polyether imide resin composition of claim 2, wherein the fibrous reinforced filler is a glass fiber coated with a silane coupling agent, urethane resin, or epoxy resin.

10. The filler reinforced polyether imide resin composition of claim 2, wherein the fibrous reinforced filler is a glass fiber having a diameter of 1 to 20 microns.

11. The filler reinforced polyether imide resin composition of claim 2, wherein the fibrous reinforced filler is a glass fiber having a length about 0.01 to 50 mm.

12. The filler reinforced polyether imide resin composition of claim 2, wherein the fibrous reinforced filler has a L/D ratio (longitudinal length/diameter) of less than 3000.

13. The filler reinforced polyether imide resin composition of claim 8, wherein the non-fibrous inorganic filler comprises scaly glass flakes having, an average diameter (L) of less than 1000 microns and an aspect ratio (ratio of diameter and thickness) of at least 5.

14. The filler reinforced polyether imide resin composition of claim 13, wherein the non-fibrous inorganic filler comprises scaly glass flakes having an aspect ratio (ratio of diameter and thickness) of at least 5.

15. The filler reinforced polyether imide resin composition of claim 14, wherein the non-fibrous inorganic filler has an aspect ratio of less than 100.

16. The filler reinforced polyether imide resin composition of claim 1, wherein said composition has a linear expansion coefficient in the flow direction of less than $2 \times 10^{-5} K^{-1}$ over the temperature range from 30° C. to 160° C. as determined by means of a TMA.

17. A molded article for use as a component of one of an automobile, electronic and electrical apparatus, home apparatus or OA apparatus, or an apparatus used for media, comprising:
   a. a polymer composition consisting of
      a polyether imide resin in the amount of 1 to 95% by weight, and
      a thermoplastic resin selected from the group consisting of polyphenylene ether, polyester, polycarbonate, polyester carbonate, polyamide, polyolefin, and polyether in the amount of 1 to 95% by weight,
   b. a fibrous type reinforced filler in the amount of 2 to 80% by weight having a L/D ratio (longitudinal length/diameter) of at least 100; and
   c. a non-fibrous inorganic filler in the amount of 2 to 80% by weight, wherein the weight percents are based on the total weight of the composition, and wherein said article has a heat deflection temperature greater than or equal to about 170° C. as determined by ASTM D648 and a linear expansion coefficient in the flow direction of less than $5 \times 10^{-5} K^{-1}$ over the temperature range from 30° C. to 160° C. as determined by means of a TMA.

18. The molded article of claim 17, further comprising less than 5% by weight of an alkali earth metal salt.

19. The molded article of claim 17, wherein the alkali earth metal salt is selected from the group consisting of sodium salt of perfluoro butane sulfonic acid, sodium salt of perfluoromethylbutane sulfonic acid, sodium salt of perfluoro octane sulfonic acid, calcium salt of perfluoro alkane sulfonic acid and potassium-perfluoro butane sulfonic acid.

20. A method for producing a filler reinforced polyether imide resin composition comprising:
   blending a polymer mixture consisting of 1 to 95% by weight of a polyether imide resin and 1 to 95% by weight of a thermoplastic resin selected from the group consisting of polyphenylene ether, polyester, polycarbonate, polyester carbonate, polyamide, polyolefin, and polyether with 2 to 80% by weight of a fibrous type reinforced filler and 2 to 80% by weight of a non-fibrous inorganic filler to produce a filler reinforced polyether imide resin composition from the mixture, wherein the weight percents are based on the total weight of the composition, said composition having a heat deflection temperature greater than or equal to about 170° C. as determined by ASTM D648 and a linear expansion coefficient in the vertical direction of less than $5\times10^{-5}K^{-1}$ over the temperature range from 30° C. to 160° C. as determined by means of a thermomechanical analizer (TMA).

* * * * *